(12) United States Patent
Kolberg et al.

(10) Patent No.: US 6,380,112 B1
(45) Date of Patent: Apr. 30, 2002

(54) SHORT FLINT SPECIAL GLASSES

(75) Inventors: Uwe Kolberg, Mainz-Kastel; Ute Wölfel; Magdalena Winkler-Trudewig, both of Mainz; Nicole Surges, Bingen, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/579,200

(22) Filed: May 26, 2000

(30) Foreign Application Priority Data

May 28, 1999 (DE) .......................... 199 24 520

(51) Int. Cl.$^7$ .................. C03C 3/064; C03C 3/066; C03C 3/068
(52) U.S. Cl. ............... 501/77; 501/78; 501/79; 501/903; 65/61; 65/122; 65/134.1
(58) Field of Search .............. 501/77, 78, 79, 501/903; 65/61, 122, 134.1

(56) References Cited

U.S. PATENT DOCUMENTS 3,529,980 A  9/1970 Bromer et al.
4,732,876 A  * 3/1988 Nagamine et al. ............ 501/78
5,340,778 A  8/1994 Kloss et al.

FOREIGN PATENT DOCUMENTS

| DE | 1022764 | 4/1956 |
| DE | 160307 | 1/1983 |
| DE | 4218377 | 10/1993 |
| JP | 60 46946 | 3/1985 |
| JP | 63222040 | 9/1988 |

* cited by examiner

*Primary Examiner*—Karl Group
(74) *Attorney, Agent, or Firm*—Millen, White, Zelano & Branigan, P.C.

(57) ABSTRACT

The invention relates to lead-free optical glasses having a refractive index $n_d$ of from 1.52 to 1.58, an Abbe number $v_d$ of from 50 to 57 and a negative partial dispersion $\Delta P_{g,F}$ of <−0.0090, having a composition (in % by weight, based on oxide) of $SiO_2$>15–25; $B_2O_3$ 45–55; $Al_2O_3$ 8–13; CaO 2–8; ZnO 0–5; with CaO+ZnO 2–10; $Li_2O$ 0–4; $Na_2O$ 0–4; $K_2O$ 0–4; with $Li_2O+Na_2O+K_2O$ 3–8; $La_2O_3$ 0–14; $Nb_2O_5$ 0–4.8; $Ta_2O_5$>10–17; with $Ta_2O_5+Nb_2O_5$>10–17; $SnO_2$ 0–2; $ZrO_2$ 0–7; with $Ta_2O_5+ZrO_2$>10–<18.

15 Claims, No Drawings

SHORT FLINT SPECIAL GLASSES

The invention relates to optical glasses which have refractive indexes $n_d$ of from 1.52 to 1.58, Abbe numbers $v_d$ of from 50 to 57 and negative anomalous partial dispersions $\Delta P_{g,F}$ of $<-0.0090$. These glasses are of the short flint special glass (SFS) type of optical glass.

Since in recent years the glass components PbO and $As_2O_3$ have been debated in public as environmental pollutants, the manufacturers of optical equipment also have a need for PbO-free and preferably also $As_2O_3$-free glasses having the respective optical properties.

Simple replacement of lead oxide by one or more constituents generally does not succeed in reproducing the desired optical and glass-engineering properties affected by PbO. Instead, new developments or extensive changes in the glass composition are necessary.

Parameters which are decisive for the use of an optical glass are the refractive index, for example $n_d$, and the change in refractive index with wavelength, known as the dispersion. A term for the change in refractive index with wavelength is the Abbe number, for example $$v_d = \frac{n_d - 1}{n_F - n_C}$$

The difference $n_F-n_C$ is known as the principal dispersion. Other differences are partial dispersions. Relative partial dispersions are the ratio of a partial dispersion to the principal dispersion, for example $$P_{g,F} = \frac{n_g - n_F}{n_F - n_C}$$

Like the Abbe number, the relative partial dispersion is an important material constant for an optical glass. The majority of glasses satisfy an approximately linear relationship between $P_{x,y}$ and $v$, according to which $P_{x,y}=a_{x,y}+b_{x,y}\cdot v$ (standard straight line).

Glasses which do not satisfy this equation are referred to as glasses having anomalous partial dispersion. The equation must then be expanded by an additional correction term $\Delta P_{x,y}$:

$$P_{x,y}=a_{x,y}+b_{x,y}v+\Delta P_{x,y}$$

Depending on whether $\Delta P_{x,y}$ is greater than or less than "0", the glasses are then referred to as glasses having positive or negative anomalous partial dispersion. Through a suitable combination of optical glasses having different Abbe numbers, the imaging flaw, chromatic aberration, can be eliminated or at least improved in lens systems, for example for 2 colours. The residual chromatic aberration (chromatism) which remains for the uncorrected colours is referred to as the secondary spectrum. This effect is particularly disadvantageous for high-performance optics, since it impairs the imaging sharpness and resolving power of the optic. However, use of glasses having anomalous partial dispersion in optical lens systems would succeed in reducing the secondary spectrum and thus giving corrected lens systems having excellent imaging sharpness and high resolving power.

Particularly desirable is correction in the blue region of the visible spectrum, for which the relative partial dispersion $P_{g,F}$ mentioned above by way of example is characteristic. In its standard straight line, $a_{g,F}=0.6438$ and $b_{g,F}=-0.001682$.

The patent literature has already revealed some specifications which describe glasses having optical values $n_d$ and $v_d$ from these or adjacent regions, only some of the glasses having high negative anomalous partial dispersion $\Delta P_{g,F}$. The glasses described have a wide variety of disadvantages:

Patent Specification DD 1603 07 relates to optical crown glasses having refractive indexes $n_e=1.500-1.555$ and Abbe numbers $ve=57-62$ with negative anomalous partial dispersion which have a very high $B_2O_3$ content, namely 73–87% by weight, and thus do not have adequate chemical resistance for practical purposes.

By contrast, DE-B 13 03 171 relates to a batch for the production of optical glasses having anomalous partial dispersion and an Abbe number $v_e=40-60$ and refractive indexes $n_e=1.52-1.64$, where the batch only contains up to 34% by weight of $B_2O_3$, but up to 40% by weight of $SiO_2$. These glasses do not achieve the desired magnitude of the negative anomalous partial dispersion.

Like the glasses of said DD 1603 07, the glasses of DE-B 1 022 764 having negative anomalous partial dispersions and Abbe numbers of from 64 to 35 and refractive indexes of from 1.53 to 1.73 do not contain $SiO_2$. Consequently, these glasses likewise do not have adequate chemical resistance.

JP 60-469 46 A discloses UV-transparent glasses of the borosilicate glass type which are predominantly in the quaternary system $CaO \cdot Al_2O_3 \cdot B_2O_3 \cdot SiO_2$ ($CaO+Al_2O_3+B_2O_3+SiO_2=9-100\%$ by weight). However, with other components <10% by weight, highly negative partial dispersion cannot be achieved.

German Patent Specification DE 42 18 377 C1 describes optical crown glasses having negative anomalous partial dispersion $\Delta P_{g,F}$, a refractive index $n_d>1.52$ and an Abbe number $v_d>57$. In these glasses, in which, inter alia, $SiO_2$ at up to 15% by weight and $Ta_2O_5$ at up to 10% by weight are only optional components, a defined water content of 0.1–0.5% by weight is necessary in order to ensure sufficiently high anomaly of the partial dispersion. Such setting of a defined water content makes glassmaking undesirably complex.

JP 63-222 040 A claims glasses from a very broad composition range which varies greatly with respect to the possible components, but lists only a few specific glasses having only a few particular constituents. This specification, which relates to glasses for ultrasound retardation lines, gives, due to the completely different objective, absolutely no indication of how a lead-free glass having a refractive index $n_d$ of from 1.52 to 1.58 and an Abbe number $v_d$ of from 50 to 57 and having a highly negative anomalous partial dispersion, namely $\Delta P_{g,F}<-0.0090$, can be produced.

This, however, is the object of the present invention. It is achieved by the glasses described herein.

The glasses contain predominant proportions of the glass formers $Al_2O_3$, $B_2O_3$ and $SiO_2$: they contain 8–13% by weight of $Al_2O_3$, which has a positive effect on the chemical resistance. At higher contents, however, the melting properties would be impaired and the tendency toward crystallization increased.

The glasses contain 45–55% by weight of $B_2O_3$. $B_2O_3$ dissolves components which are difficult to melt, and $B_2O_3$ lowers the negative partial dispersion $\Delta P_{g,F}$ (i.e. increases its value) of the glasses. At higher contents, the chemical resistance would be impaired and the Abbe number would be too high.

The glasses contain $SiO_2$ in contents of greater than 15% by weight and at most 25% by weight. At lower contents, the good chemical resistance drops, while at higher contents, the good melting properties are impaired. The $SiO_2$ content helps to achieve an Abbe number in the low region desired.

CaO, present to the extent of 2–8% by weight, and optionally also ZnO (0–5% by weight), increase the refractive index and contribute to the lowering of $\Delta P_{g,F}$. At excessively high contents, the Abbe number would be too high and the chemical resistance would be impaired, and therefore the sum of CaO and ZnO should remain limited to 10% by weight.

The glasses contain from 3 to 8% by weight of alkali metal oxides, which improve the melting properties of the glasses and stabilize them against separation. The said total content can be achieved by means of 0–4% by weight of $Na_2O$, 0–4% by weight of $K_2O$ and 0–4% by weight of $Li_2O$. Preferably, however, at least two alkali metal oxides are present, in particular at least $Na_2O$ and $K_2O$. It is particularly preferred for all three components to be present.

The glasses may furthermore contain up to 14% by weight of $La_2O_3$. $La_2O_3$ supports a high Abbe number at the same time as a high refractive index.

The glasses contain $Ta_2O_5$ in an amount of at least >10% by weight in order to achieve the desired high negative anomalous partial dispersion, and at most 17% by weight, since otherwise separation would occur. In addition, $Ta_2O_5$ improves the chemical resistance and increases the refractive index, as do the optional components $Nb_2O_5$ and $ZrO_2$.

$Nb_2O_5$ can support $Ta_2O_5$ in its effect on the partial dispersion. In addition, it has positive effects on a low Abbe number. Owing to the separation which occurs at higher contents, the $Nb_2O_5$ content is restricted to a maximum of 4.8% by weight, preferably to <4.8% by weight, and the sum of $Nb_2O_5$ and $Ta_2O_5$ is restricted to a maximum of 17% by weight, preferably to <15% by weight.

For the same reason, the $ZrO_2$ content is also restricted to a maximum of 7% by weight, preferably to <7% by weight, the sum of $ZrO_2$ and $Ta_2O_5$ being restricted to <18% by weight. It is preferred also to restrict the sum of $ZrO_2$, $Nb_2O_5$ and $Ta_2O_5$ to a maximum of 18% by weight.

The glasses can contain up to 2% by weight of $SnO_2$. $SnO_2$ is used to fine tune $n_d$ and $v_d$, $n_d$ rising and $v_d$ falling with increasing $SnO_2$ concentration.

In order to improve the glass quality, one or more fining agents known per se can be added to the batch in the usual amounts in order to fine the glasses. In this way, the glasses have particularly good internal glass quality with respect to freedom from bubbles and streaks.

If the fining agent used is not $As_2O_3$ or $Sb_2O_3$, the lead-free glasses according to the invention are in addition free from arsenic and antimony.

Since $SnO_2$ also has a fining function, the presence of at least 0.1% by weight of $SnO_2$ is preferred. These glasses, even without further fining agents, have excellent internal glass quality.

Within the composition range according to the invention, there is a preferred composition range of glasses having refractive indexes $n_d$ of from 1.52 to 1.575 and Abbe numbers $v_d$ of from 50 to 56.5. It is (in % by weight, based on oxide): $SiO_2$>15–23.5, $B_2O_3$ 45–50, $Al_2O_3$ 8–11.5, CaO 2–5.5, ZnO 0–<5, with CaO+ZnO≦10, $Li_2O$ 0–2.5, $Na_2O$ 1–2.5, $K_2O$ 0.5–2, with $Li_2O$ +$Na_2O$+$K_2O$ 3–6, $La_2O_3$ 0–13.5, $Nb_2O_5$ 0–<4.8, $Ta_2O_5$>10–15, with $Ta_2O_5$+$Nb_2O_5$≦15, $SnO_2$ 0.1–0.5, $ZrO_2$ 0–<7, with $Ta_2O_5$+$ZrO_2$<18.

Particular preference is given to glasses from the composition range (in % by weight, based on oxide): $SiO_2$>15–16, $B_2O_3$ 48–50, $Al_2O_3$ 8–11.5, CaO 2–4, ZnO 1–<5, with CaO+ZnO≦8.5, $Li_2O$ 0–2, $Na_2O$ >1–2, $K_2O$ 0.6–2, with $Li_2O$+$Na_2O$+$K_2O$ 3–6, $Nb_2O_5$ 0–2, $Ta_2O_5$>10–<15, with $Ta_2O_5$+$Nb_2O_5$<15, $SnO_2$ 0.1–0.4, $ZrO_2$ 1–<7, with $Ta_2O_5$+$ZrO_2$<18. These glasses have refractive indexes $n_d$ of from 1.54 to 1.56 and Abbe numbers $v_d$ of from 52.5 to 54.5.

EXAMPLES 13 examples of glasses according to the invention were produced from conventional raw materials. Table 2 shows the respective compositions (in % by weight, based on oxide) of the glasses, their refractive index $n_d$, their Abbe number $v_d$, the partial dispersion in the blue region of the spectrum $P_{g,F}$, and the anomaly of this partial dispersion $\Delta P_{g,F}$.

For some of the glasses, the coefficient of thermal expansion $\alpha_{20/300}$ [$10^{-6}$/K], the glass transition temperature $T_g$ [°C.], the internal spectral transmission factor at wavelength $\lambda$=400 nm and a sample thickness d=25 mm $\tau_{i\ 400\ nm/25\ mm}$ and the water content [mol/l] are also shown.

The glasses according to the invention were produced as follows: the oxides or raw materials for the oxides, preferably carbonates and also nitrates, were weighed out. The fining agent(s) was (were) added, and the components were then mixed thoroughly. The glass batch was melted at about 1280–1300° C. in a batch melting unit, then fined and homogenized well. The casting temperature was about 1040° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

Table 1 shows a melt example.

TABLE 1

| Melt example for 100 kg of calculated glass | | | |
|---|---|---|---|
| Oxide | % by wt. | Raw material | Weight [kg] |
| $Al_2O_3$ | 10.9 | AlO(OH) | 13.9 |
| $B_2O_3$ | 48.7 | $H_3BO_3$ | 86.5 |
| CaO | 4 | $CaCO_3$ | 7.1 |
| $K_2O$ | 0.8 | $KNO_3$ | 1.7 |
| $Li_2O$ | 1.75 | $Li_2CO_3$ | 4.4 |
| $Na_2O$ | 1.45 | $Na_2CO_3$ | 2.5 |
| $Nb_2O_5$ | 1.25 | $Nb_2O_5$ | 1.3 |
| $SiO_2$ | 15.2 | $SiO_2$ | 15.2 |
| $SnO_2$ | 0.4 | $SnO_2$ | 0.4 |
| $Ta_2O_5$ | 10.25 | $Ta_2O_5$ | 10.3 |
| ZnO | 3.9 | ZnO | 3.9 |
| $ZrO_2$ | 1.4 | $ZrO_2$ | 1.4 |

The properties of the resultant glass are shown in Table 2, Example 1.

TABLE 2

Compositions (in % by weight, based on oxide) and essential properties

| | 1 | 2 | 3 | 4 | 5 | 6 | 7 |
|---|---|---|---|---|---|---|---|
| $Al_2O_3$ | 10.9 | 11.25 | 10.9 | 9.5 | 9.5 | 9.5 | 9.5 |
| $B_2O_3$ | 48.7 | 48.7 | 48.7 | 48.95 | 48.95 | 48.95 | 48.95 |
| CaO | 4.0 | 4.0 | 3.5 | 3.5 | 3.0 | 3.0 | 5.35 |
| $K_2O$ | 0.8 | 0.95 | 0.8 | 0.8 | 0.65 | 0.65 | 2.0 |
| $La_2O_3$ | — | — | — | — | — | 5 | — |
| $Li_2O$ | 1.75 | — | 1.75 | 1.75 | 1.5 | 1.5 | 2.0 |
| $Na_2O$ | 1.45 | 1.95 | 1.45 | 1.45 | 1.2 | 1.2 | 2.0 |
| $Nb_2O_5$ | 1.25 | 2.0 | 1.5 | 1.0 | — | — | — |
| $SiO_2$ | 15.2 | 15.2 | 15.2 | 15.2 | 15.1 | 15.1 | 15.1 |
| $SnO_2$ | 0.4 | 0.4 | 0.4 | 0.4 | 0.4 | 0.4 | 0.4 |
| $Ta_2O_5$ | 10.25 | 10.25 | 10.25 | 10.25 | 10.1 | 10.1 | 10.1 |
| ZnO | 3.9 | 3.9 | 3.9 | 4.65 | 4.6 | 4.6 | 4.6 |
| $ZrO_2$ | 1.4 | 1.4 | 1.65 | 2.55 | 5.0 | — | — |
| $n_d$ | 1.55177 | 1.54402 | 1.55256 | 1.55579 | 1.55560 | 1.55488 | 1.55146 |
| $v_d$ | 54.07 | 52.96 | 53.74 | 53.89 | 54.04 | 55.52 | 56.03 |
| $P_{g,F}$ | 0.5418 | 0.5431 | 0.5421 | 0.5416 | 0.5410 | 0.5395 | 0.5389 |
| $\Delta P_{g,F}$ | −0.0111 | −0.0116 | −0.0113 | −0.0115 | −0.0119 | −0.0109 | −0.0106 |
| $\alpha_{20/300}$ [$10^{-6}$/K] | n.m. | n.m. | n.m. | 5.43 | 5.22 | 5.34 | 6.11 |
| $T_g$ [°C.] | 486 | n.m. | n.m. | 482 | 488 | 499 | 488 |
| $T_{I\ 400nm/25mm}$ | 0.9784 | 0.9437 | 0.9685 | 0.9731 | n.m. | n.m. | n.m. |
| $H_2O$ [mol/l] | n.m. | 0.1477 | n.m. | 0.1392 | 0.1024 | n.m. | n.m. |

| | 8 | 9 | 10 | 11 | 12 | 13 |
|---|---|---|---|---|---|---|
| $Al_2O_3$ | 8.0 | 8.0 | 8.0 | 9.5 | 9.5 | 8.0 |
| $B_2O_3$ | 47.4 | 45.0 | 49.4 | 48.95 | 48.95 | 49.9 |
| CaO | 2.0 | 2.0 | 2.0 | 3.0 | 3.0 | 2.0 |
| $K_2O$ | 2.0 | 2.0 | 2.0 | 0.65 | 0.65 | 2.0 |
| $La_2O_3$ | 10.0 | 13.4 | — | — | — | — |
| $Li_2O$ | 2.0 | 2.0 | 2.0 | 1.5 | 1.5 | 2.0 |
| $Na_2O$ | 2.0 | 2.0 | 2.0 | 1.4 | 1.4 | 2.0 |
| $Nb_2O_5$ | — | — | — | — | 4.8 | — |
| $SiO_2$ | 15.1 | 15.1 | 23.1 | 15.1 | 15.1 | 15.6 |
| $SnO_2$ | 0.4 | 0.4 | 0.4 | 0.4 | 0.4 | 0.4 |
| $Ta_2O_5$ | 10.1 | 10.1 | 10.1 | 14.9 | 10.1 | 10.1 |
| ZnO | 1.0 | — | 1.0 | 4.6 | 4.6 | 1.0 |
| $ZrO_2$ | — | — | — | — | — | 7.0 |
| $n_d$ | 1.56075 | 1.57084 | 1.52282 | 1.54990 | 1.55838 | 1.54891 |
| $v_d$ | 55.77 | 55.64 | 56.34 | 53.42 | 50.20 | 53.28 |
| $P_{g,F}$ | 0.5399 | 0.5409 | 0.5375 | 0.5420 | 0.5496 | 0.5425 |
| $\Delta P_{g,F}$ | −0.0101 | −0.0094 | −0.0115 | −0.0119 | −0.0098 | −0.0117 |
| $\alpha_{20/300}$ [$10^{-6}$/K] | 6.12 | n.m. | 5.97 | n.m. | n.m. | n.m. |
| $T_g$ [°C.] | 481 | n.m. | 441 | n.m. | n.m. | n.m. |
| $T_{I\ 400nm/25mm}$ | n.m. | n.m. | n.m. | n.m. | n.m. | n.m. |
| $H_2O$ [mol/l] | 0.0837 | n.m. | n.m. | n.m. | n.m. | n.m. | n.m. = not measured

The glasses according to the invention represent a group of short flint special glasses which are distinguished by a high value of a negative anomalous partial dispersion $\Delta P_{g,F}$. The glasses are lead-free and, in a preferred embodiment, also $As_2O_3$- and $Sb_2O_3$-free.

The chemical resistance of the glasses is sufficiently good. The transmission of the glasses in the visible region of the spectrum is high. The glasses are easy to melt and have good processing properties. Their crystallization stability is also adequate for production in the composition range according to the invention. In particular with only slightly higher contents of $Nb_2O_5$, $ZrO_2$ or $Ta_2O_5$, the glasses would have an excessive tendency toward crystallization and/or separation, as shown by the comparative compositions (in % by weight, based on oxide) V1 (comparison with Glass No. 13, which is still stable), V2 (comparison with Glass No. 12, which is still stable) and V3, which did not give a glass under the said production conditions:

V1: $Al_2O_3$ 8.0; $B_2O_3$ 49.9; CaO 2.0; $K_2O$ 2.0; $Li_2O$ 2.0; $Na_2O$ 2.0; $SiO_2$ 15.1; $SnO_2$ 0.4; $Ta_2O_5$ 10.1; ZnO 1.0; $ZrO_2$ 7.5;

V2: $Al_2O_3$ 9.5; $B_2O_3$ 48.95; CaO 3.0; $K_2O$ 0.65; $Li_2O$ 1.5; $Na_2O$ 1.2; $Nb_2O_5$ 5.0; $SiO_2$ 15.1; $SnO_2$ 0.4; $Ta_2O_5$ 10.1; ZnO 4.6;

V3: $Al_2O_3$ 8.5; $B_2O_3$ 47.95; CaO 2.0; $K_2O$ 0.65; $Li_2O$ 1.5; $Na_2O$ 1.4; $SiO_2$ 15.1; $SnO_2$ 0.4; $Ta_2O_5$ 19.9; ZnO 2.6.

The water content determined for some of the examples according to the invention (given in the Table in mol/l) shows that the negative anomalous partial dispersion is, not dependent on the water content in this glass system. Even the glasses having contents of <0.1% by weight (see Example Nos. 5 and 8) have high $\Delta P_{g,F}$ values.

The glasses can therefore be produced from conventional anhydrous or water-containing (for example $H_3BO_3$ or AlO(OH), see melt example) raw materials without particular precautions having to be taken to set a defined water content.

The preceding examples can be repeated with similar success by substituting the generically or specifically described compositions, reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosure of all applications, patents and publications, cited above, are hereby incorporated by reference.

This application claims priority under 35 USC Section 119 to German Patent Application 19924520.7, filed May 28, 1999, which application is expressly incorporated herein by reference.

Not intending to be limited by the specific examples and preferred embodiments discussed hereinbefore, but only by the claims which follow, the applicants claim:

1. An essentially lead-free optical glass, having a refractive index $n_d$ of from 1.52 to 1.58, an Abbe number $v_d$ of from 50 to 57, and a negative partial dispersion $\Delta P_{g,F}$ of less than −0.0090 comprising, in % by weight, based on oxide:
   >15%–25% $SiO_2$,
   45%–55% $B_2O_3$,
   8%–13% $Al_2O_3$,
   2%–8% CaO,
   0%–5% ZnO,
   0%–4% $Li_2O$,
   0%–4% $Na_2O$,
   0%–4% $K_2O$,
   0%–14% $La_2O_3$,
   0%–4.8% $Nb_2O_5$,
   >10%–17% $Ta_2O_5$,
   0%–2% $SnO_2$, and
   0%–7% $ZrO_2$, wherein
   the combined amount of CaO and ZnO is 2%–10%,
   the combined amount of $Li_2O$, $Na_2O$, and $K_2O$ is 3%–8%,
   the combined amount of $Ta_2O_5$ and $Nb_2O_5$ is >10%–17%, and
   the combined amount of $Ta_2O_5$ and $ZrO_2$ is >10% to <18%.

2. An optical glass as claimed in claim 1, further comprising fining agents.

3. An optical glass as claimed in claim 1, wherein the glass contains at least 0.1% by weight of $SnO_2$.

4. An optical glass as claimed in claim 1, wherein the refractive index of the glass $n_d$ is from 1.52 to 1.575, the Abbe number $v_d$ is from 50 to 56.5, and the glass, by weight % based on oxide, comprises
   >15%–23.5% $SiO_2$,
   45%–50% $B_2O_3$,
   8%–11.5% $Al_2O_3$,
   2%–5.5% CaO,
   0% to <5% ZnO,
   0%–2.5% $Li_2O$,
   1%–2.5% $Na_2O$,
   0.5%–2% $K_2O$,
   0%–13.5% $La_2O_3$,
   0% to <4.8% $Nb_2O_5$,
   >10%–15% $Ta_2O_5$,
   0.1–0.5% $SnO_2$, and
   0% to <7% $ZrO_2$, wherein
   the combined amount of CaO and ZnO is 2%–10%,
   the combined amount of $Li_2O$, $Na_2O$, and $K_2O$ is 3%–6%,
   the combined amount of $Ta_2O_5$ and $Nb_2O_5$ is from >10%–15%, and
   the combined amount of $Ta_2O_5$ and $ZrO_2$ is from >10% to <18%.

5. An optical glass as claimed in claim 1, wherein the refractive index $n_d$ is 1.54–1.56, the Abbe number $v_d$ is 52.5–54.5, and the glass comprises
   >15%–16% $SiO_2$,
   48%–50% $B_2O_3$,
   8%–11.5% $Al_2O_3$,
   2%–4% CaO,
   1% to <5% ZnO,
   0%–2% $Li_2O$,
   >1%–2% $Na_2O$,
   0.6%–2% $K_2O$,
   0%–2% $Nb_2O_5$,
   >10% to <15% $Ta_2O_5$,
   0.1–0.4% $SnO_2$, and
   0% to <7% $ZrO_2$, wherein
   the combined amount of CaO and ZnO is 3%–8.5%,
   the combined amount of $Li_2O$, $Na_2O$, and $K_2O$ is 3%–6%,
   the combined amount of $Ta_2O_5$ and $Nb_2O_5$ is from >10% to <15%, and
   the combined amount of $Ta_2O_5$ and $ZrO_2$ is from >10% to <18%.

6. An optical glass as claimed in claim 1, wherein the glass is essentially free from arsenic oxide and antimony oxide.

7. An optical glass, comprising, in % by weight, based on oxide:
   from greater than 15% to 25% $SiO_2$,
   from 45% to 55% $B_2O_3$,
   from 8% to 13% $Al_2O_3$,
   from 2% to 8% CaO,
   >10%–17% $Ta_2O_5$, wherein
   the optical glass is essentially lead-free, and the optical glass has a refractive index $n_d$ of 1.52–1.58, an Abbe number $v_d$ of 50–57, and a negative anomalous partial dispersion $\Delta P_{g,F}$ of <−0.0090.

8. An optical glass as claimed in claim 7, further comprising:
   up to and including 5% ZnO,
   up to and including 4% $Li_2O$,
   up to and including 4% $Na_2O$,
   up to and including 4% $K_2O$,
   up to and including 14% $La_2O_3$,
   up to and including 4.8% $Nb_2O_5$,
   up to and including 2% $SnO_2$, and
   up to and including 7% $ZrO_2$, wherein
   the combined amount of CaO and ZnO is 2%–10%,
   the combined amount of $Li_2O$, $Na_2O$, and $K_2O$ is 3%–8%,
   the combined amount of $Ta_2O_5$ and $Nb_2O_5$ is >10%–17%, and
   the combined amount of $Ta_2O_5$ and $ZrO_2$ is >10% to <18%.

9. An optical glass as claimed in claim 7, wherein the glass has a total content of alkali metal oxide of 3%–8%.

10. An optical glass as claimed in claim 8, wherein at least two alkali metal oxides are present.

11. An optical glass as claimed in claim 8, wherein three alkali metal oxides are present.

12. A lens formed from an optical glass as claimed in claim 1.

13. An optical device comprising at least one optical glass as claimed in claim 1.

14. A method of making an optical glass, comprising mixing, in % by weight,
>15%–25% $SiO_2$,
45%–55% $B_2O_3$,
8%–13% $Al_2O_3$,
2%–8% CaO,
0%–5% ZnO,
0%–4% $Li_2O$,
0%–4% $Na_2O$,
0%–4% $K_2O$,
0%–14% $La_2O_3$,
0%–4.8% $Nb_2O_5$,
>10%–17% $Ta_2O_5$,
0%–2% $SnO_2$, and
0%–7% $ZrO_2$, wherein
the combined amount of CaO and ZnO is 2%–10%,
the combined amount of $Li_2O$, $Na_2O$, and $K_2O$ is 3%–8%,
the combined amount of $Ta_2O_5$ and $Nb_2O_5$ is >10%–17%, and
the combined amount of $Ta_2O_5$ and $ZrO_2$ is >10% to <18% to form a mixture,
melting the mixture to form a melt,
fining and homogenizing the melt, and
casting the melt to form an essentially lead-free glass having a refractive index $n_d$ of from 1.52 to 1.58, an Abbe number $v_d$ of from 50 to 57, and a negative partial dispersion $\Delta P_{g,F}$ of less than −0.0090.

15. A lens formed by the process as claimed in claim 14, additionally comprising grinding or polishing the glass to form a lens.

* * * * *